United States Patent Office 2,767,188
Patented Oct. 16, 1956

2,767,188
METHOD FOR PREPARING PHENANTHRIDINIUM SALTS

Leslie Percy Walls, London, England, assignor to Burroughs Wellcome & Co. (U. S. A.) Inc., Tuckahoe, N. Y., a corporation of New York No Drawing. Application June 9, 1953, Serial No. 360,589

Claims priority, application Great Britain June 13, 1952

8 Claims. (Cl. 260—286)

The present invention relates to methods of preparation of phenanthridinium salts.

Derivatives of phenanthridine have been studied for some time and members of the group have been found to possess antibacterial and trypanocidal properties.

It has been found that small changes in structure in this class of compounds have very considerable effects on biological activity, and it is of importance in this group to find methods of synthesis whereby the more readily available phenanthridine compounds may be converted into compounds having other substituents the position in the molecule of which is known with certainty.

A process, forming the subject of the present invention has now been discovered whereby phenanthridinium salts containing more than one primary amino-group can be reacted with acylating agents so that some only of such groups are acylated, other amino-groups remaining unaffected. This result is achieved by reacting a quaternary phenanthridinium salt containing an amino-group in the 2- or 3- position, and at least one other amino-group in aqueous, aqueous alcoholic or alcoholic solution with one molecule of acid anhydride or other acylating agent such as the acid chloride, whereby the amino-group in the 2- or 3- position remains unacylated, the other amino-group or groups being acylated.

According to the present invention therefore there is provided a process for preparing phenanthridinium salts having at least one primary amino-group in the 2- or 3- position, and one acylated amino-group either on the phenanthridine nucleus or on a 9-aryl substituent thereof, said process comprising reacting a 2- or 3-aminophenanthridinium salt carrying another amino group in the position required for the acylamido-group with substantially one molecule of an acylating agent in aqueous, aqueous alcoholic or alcoholic solution.

Thus, for example, 2:1-diamino-9-phenyl-10-methylphenanthridinium chloride, the trypanocide known as Dimidium chloride (Formula I, A=Cl; R=CH₃), on treatment with one molecule of acetic anhydride in the above manner, gives a good yield of a mono-acetamido compound which is identical in all respects, notably its infra-red absorption spectrum, with 7-acetamido-2-amino-9-phenyl-10-methylphenanthridinium chloride (Formula II, A=Cl, R=R'=CH₃). This substance has been synthesised by a route involving many stages, which establishes its constitution (Caldwell and Walls, Journal of the Chemical Society, 1948, page 188).

The method is not limited to chlorides, other salts, for example, bromides, sulphates or ethanesulphonates, being suitable, the choice depending on availability and convenient solubility in the preferred solvents for the reaction, namely, water, methanol, ethanol, or mixtures of these solvents.

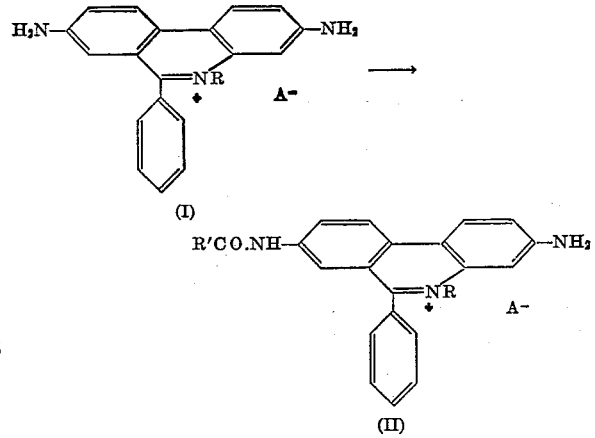

The method is applicable to other than methyl quaternary salts, giving a high yield of mono-acetyl derivatives when in the above formula R=C₂H₅.

Other anhydrides than acetic anhydride react similarly, the reaction being general for aliphatic, aromatic, and arylaliphatic anhydrides. Thus mixed formic acetic anhydride gives a mono-formyl derivative (in the above formula R'=H), propionic anhydride, a mono-propionyl derivative (R'=Et), n-butyric anhydride, a mono-butyryl derivative (R'=nPr), and benzoic anhydride, a mono-benzoyl derivative (R'=Ph). In carrying out the reaction it has been found that if the alternative mono-acyl derivative (that is, in the above example, 2-acetamido-7-amino-9-phenyl-10-methylphenanthridinium chloride) is formed at all, the amount is so small that isolation of the main product in high yield is readily accomplished. Provided excess of anhydride is avoided, the amount of di-acyl derivative formed is also very small. For the purpose of the reaction the acid anhydrides may be replaced by the corresponding acid chlorides, but not with advantage, for then larger quantities of diacyl derivatives are formed, and separation of the products becomes more difficult.

The invention is not limited to phenanthridinium salts of the above formula, but is general for those containing more than one primary amino-group. Thus 2:7-diamino-9-α-thienyl-10-methylphenanthridinium chloride is converted into 7-acetamido-2-amino-9-α-thienyl-10-methylphenanthridinium chloride. 2:7-diamino-9-p-nitrophenyl-10-methylphenanthridinium chloride can be subjected to a series of operations as follows:

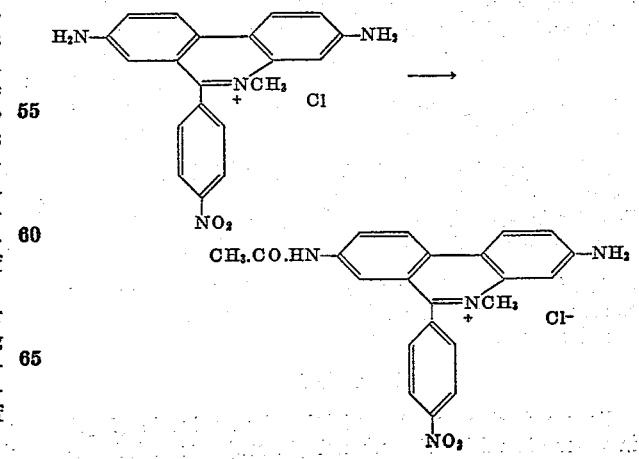

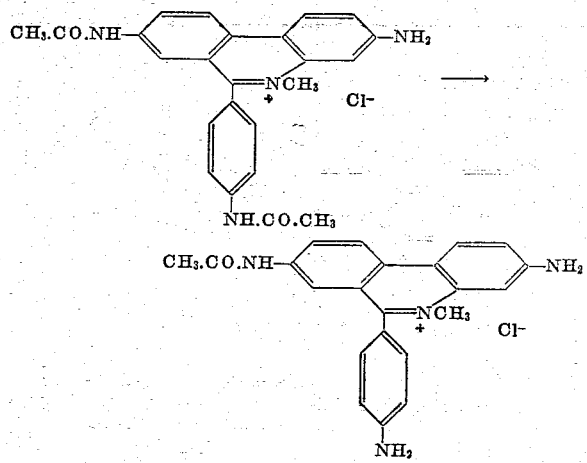

With 2-amino-9-p-aminophenyl-10-methylphenanthridinium chloride (Caldwell & Walls, loc. cit.) the reaction takes the following course:

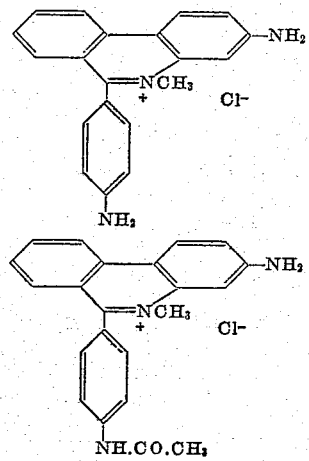

It thus appears that the course of the reaction is determined by the reluctance of the 2-amino group to react under the conditions specified in the invention. This may be due to the proximity of the 2-amino group to the quaternary nitrogen atom, but is more probably due to that group sharing the positive charge through resonance.

For the 3-amino compounds the former factor alone is operative, and this no doubt accounts for the lower yield of 7-acetamido compound from 3:7-diamino-9-phenyl-10-methylphenanthridinium chloride, a greater proportion of diacyl derivative being formed.

As already mentioned, the compound 7-acetamido-2-amino-9-phenyl-10-methylphenanthridinium chloride has already been prepared by an alternative, though less convenient route. The new process also makes available certain compounds which have not hitherto been made and which have now been found to have useful therapeutic activity against infections in cattle caused by species of Babesia. These novel and useful compounds are 10-alkyl quaternary salts, preferably the 10-methyl quaternary salts, of the following phenanthridines:

2-amino-7-propionamido-9-phenylphenanthridine,
2-amino-7-n-butyramido-9-phenylphenanthridine,
7-acetamido-2-amino-9-p-aminophenylphenanthridine and
3-amino-7-acetamido-9-phenylphenanthridine.

The invention will now be described with reference to the accompanying examples in which all temperatures are given in degrees centigrade.

*Example 1*

To a refluxing solution of Dimidium chloride (2 g.) in water (20 ml.) and methanol (20 ml.) was added acetic anhydride (0.6 ml.). After 30 minutes at the boil, the solution, the colour of which had changed from purple to red, was cooled. 7-acetamido-2-amino-9-phenyl-10-methylphenanthridinium chloride crystallised in dark red prisms (total yield 800 mg.), which were recrystallised from methanol and had a melting point with decomposition of about 268°.

The same product was obtained when methanol only was used as solvent.

Dimidium chloride (5 g.) was dissolved in water (50 ml.) shaken at 100° with acetic anhydride (1.5 ml.). The product began at once to crystallise out, and after 30 minutes was collected (4 g.). By reaction with silver ethanesulphonate in boiling methanol, the more soluble ethanesulphonate was obtained in dark red prisms, decomposing about 300°.

The ethanesulphonate can also be obtained directly from Dimidium bromide. To a suspension of Dimidium bromide (5 g.) in boiling ethanol was added one equivalent of silver ethanesulphonate. Silver bromide was removed by filtration, and the boiling filtrate was then treated with acetic anhydride (1.5 ml.) After 30 minutes the solution was concentrated to small bulk. The ethanesulphonate (3.1 g.) slowly crystallised. It was recrystallised from a small volume of water in minute brick-red needles, which were collected by filtration. The thixotropic mass was stirred into acetone, again filtered and washed with acetone.

7-acetamido-2-amino-9-phenyl-10-methylphenanthridinium bromide was prepared from a methanolic solution of Dimidium bromide. The sulphate was similarly prepared, either directly from Dimidium salt or by metathesis of the chloride with silver sulphate; it crystallised from water in magnificent dark-red elongated plates, which decomposed about 300°. The acetate, which crystallised from water in small scarlet prisms, the isethionate, which formed scarlet needles, and the lactate, matted scarlet needles, were obtained by metathesis of the sulphate in aqueous solution with the appropriate barium salt, and were all more soluble in water than the ethanesulphonate.

*Example 2*

Dimidium chloride (4 g.) was dissolved in hot water (40 ml.), and the solution shaken with acetic formic anhydride (1.2 ml.). An immediate precipitation of 2-amino-7-formamido-9-phenyl-10-methylphenanthridinium chloride in dull red microscopic crystals occurred. After 30 minutes on the steam bath the mixture was cooled, and the product collected (3.1 g.). It was recrystallised from methanol in dull-red prisms. The corresponding ethanesulphonate was much more soluble in water; it decomposed at about 285°.

2-amino-7-propionamido-9-phenyl-10-methylphenanthridinium chloride and ethanesulphonate (dull red prisms, decomposing at about 258°) were prepared in the same way, using propionic anhydride.

2-amino-7-n-butyramido-9-phenyl-10-methylphenanthridium chloride and ethanesulphonate (dull-red prisms, decomposing at about 250°) were similarly obtained.

2-amino-7-benzamido-9-phenyl-10-methylphenanthridinium chloride was best prepared from Dimidium chloride and benzoic anhydride in refluxing methanolic solution. The ethanesulphonate crystallised from acetone-methanol in red needles, which decomposed about 283°.

*Example 3*

A solution of 2:7-diamino-9-phenyl-10-ethylphenanthridinium bromide (1.5 g.) in hot water (15 ml.) was shaken with acetic anhydride (0.4 ml.). Crystals of 7-acetamido-2-amino-9-phenyl-10-methylphenanthridinium bromide began at once to separate. After 30 minutes at 100° the reaction mixture was cooled, and the product (1.2 g.) was collected. It was converted into the ethanesulphonate, which formed scarlet needles decomposing at 229–231°.

*Example 4*

2:7 - diamino - 9:10 - dimethlphenanthridinium chloride (2 g.) was dissolved in hot water (25 ml.), and the solution was shaken with acetic anhydride (0.8 ml.). The reaction mixture was then heated at 100° for 30 minutes. On cooling 7-acetamido-2-amino-9:10-dimethyl-phenanthridinum chloride (1.6 g.) crystallised in light red needles, melting point 277–278° with decomposition.

*Example 5*

3:7 - diamino - 9- phenyl - 10 - methylphenanthridinium chloride (8 g.) was dissolved in methanol (60 ml), and the solution was refluxed for 30 minutes with acetic anhydride (2.4 ml.). After standing at 5° overnight crystals separated, which were collected and recrystallised from water. 7-acetamido-3-amino-9-phenyl-10-methylphenanthridinium chloride (2 g.) crystallised in yellow prisms, which melted with decomposition ca. 289°.

*Example 6*

2:7 - diamino - 9 - α - thienyl - 10 - methylphenanthridinium chloride (2 g.) was dissolved in methanol (20 ml.) and refluxed with acetic anhydride (0.7 ml.) The solution lost its characteristic blue colour and became deep red. After 15 minutes the solution was cooled, so that 7-acetamido - 2 - amino - 9 - α - thienyl - 10 - methylphenanthridinium chloride crystallised in needles (1.4 g.) with coppery lustre, which on recrystallisation from methanol formed dark red prisms, decomposing at about 263°. The ethanesulphonate crystallised from methanol in crimson leaves, which decomposed about 260°.

*Example 7*

When the method of the previous example was applied to 2:7 - diamino - 9 - p - nitrophenyl - 10 - methylphenanthridinium chloride, the 7- acetyl compound crystallised from the reaction mixture in high yield. The ethanesulphonate formed transparent brownish purple diamond-shaped plates which decomposed at about 210° without melting.

This ethanesulphonate (3 g.) was dissolved in boiling water (300 ml.) and reduced with ferrous hydroxide (prepared as a sludge from 15 g. ferrous sulphate and 17 g. barium hydroxide cryst.). After 30 minutes at 100° the reaction mixture was filtered, and the red filtrate was treated with ammonium chloride. 7-acetamido-2-amino-9-p-aminophenyl - 10 - methylphenanthridinium chloride then separated in scarlet needles (1.9 g.). On crystallisation from methanol this salt formed red prisms, which decomposed at 302°.

A solution of this salt (1 g.) in boiling methanol (40 ml.) was treated with acetic anhydride (0.3 ml.). After 30 minutes under reflux, concentration to small bulk and cooling, red needles separated (0.9 g.). On recrystallisation from methanol, this salt, which is believed to be 7-acetamido-2-amino-9-p-acetamidophenyl-10-methylphenanthridinium chloride, formed thin elongated light scarlet plates, melting over a range 240–280°.

*Example 8*

A solution of 2-amino-9-p-aminophenyl-10-methylphenanthridinium chloride (500 mg.) in water (10 ml.) at 100° was shaken with acetic anhydride (0.15 ml.). After 30 minutes at 100° a little ammonium chloride was added and the solution cooled. On cooling 2-amino-9-p-acetamido-phenyl-10-methyl-phenanthridinium chloride crystallised in orange prisms (500 mg.), melting with decomposition at 222–224°.

I claim:

1. A process for preparing phenanthridinium salts having a primary amino group in a position selected from the group consisting of the 2- and 3- positions of the phenanthridine nucleus and an acylamido group carried in a position selected from the phenanthridine nucleus and a 9-aryl substituent thereof, said process comprising reacting a corresponding diamino phenanthridinium salt with substantially a molecular equivalent of an organic acylating agent derived from a lower aliphatic acid in a solvent selected from the group consisting of aqueous, aqueous alcoholic and alcoholic solvents.

2. A process as claimed in claim 1 in which the acylating agent is the anhydride of an aliphatic acid having from 1 to 4 carbon atoms.

3. A process as claimed in claim 1 in which the reaction is carried out in an aqueous solution of a lower aliphatic alcohol.

4. A process as claimed in claim 1 in which the acylamido group is in the 7- position on the phenanthridine nucleus.

5. A process as claimed in claim 1 in which the phenanthridinium salt contains a 9-α-thienyl group.

6. A process as claimed in claim 1 in which the phenanthridinium salt contains a 9-phenyl group.

7. A process as claimed in claim 1 in which the phenanthridinium salt contains a 9-p-aminophenyl group the amino-group of which becomes acylated.

8. A process of preparing phenanthridinium salts of the general formula

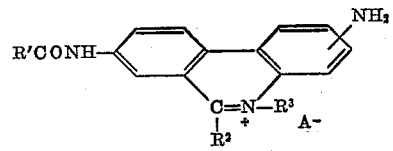

in which R′ is an alkyl group having from 1 to 3 carbon atoms, R² is selected from the class consisting of phenyl and p-aminophenyl groups, R³ is a lower alkyl radical, the —NH₂ group is in a position selected from the 2- and the 3- position and A⁻ is an anion, said process comprising reacting a phenanthridinium salt of the formula

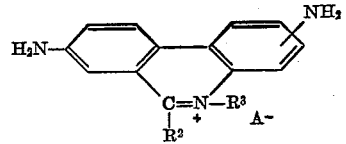

with substantially a molecular equivalent of an anhydride of an unsubstituted, unsaturated aliphatic carboxylic acid of from one to four carbon atoms in a solvent selected from the group consisting of aqueous, aqueous alcoholic and alcoholic solvents.

References Cited in the file of this patent

Walls et al.: J. Chem. Soc., 1950, pp. 41–47, 3511–16.